(12) United States Patent
Landgraf et al.

(10) Patent No.: US 12,609,979 B2
(45) Date of Patent: Apr. 21, 2026

(54) PARTITIONING, RENDERING, AND BLENDING OF EXTENDED REALITY APPLICATION INSTANCES

(71) Applicant: Holo-Light GmbH, Innsbruck (AT)

(72) Inventors: Philipp Landgraf, Altenmarkt a.d. Alz (DE); Alexander Werlberger, Haimhausen (DE)

(73) Assignee: Palo Alto Networks, Inc., Santa Clara, CA (US)

( * ) Notice: Subject to any disclaimer, the term of this patent is extended or adjusted under 35 U.S.C. 154(b) by 156 days.

(21) Appl. No.: 18/481,676

(22) Filed: Oct. 5, 2023

(65) Prior Publication Data

US 2024/0121285 A1      Apr. 11, 2024

(30) Foreign Application Priority Data

Oct. 6, 2022     (EP) ..................................... 22200050

(51) Int. Cl.
*G06T 15/00* (2011.01)
*H04L 65/61* (2022.01)

(52) U.S. Cl.
CPC .............. *H04L 65/61* (2022.05); *G06T 15/00* (2013.01)

(58) Field of Classification Search
CPC .......... G06F 3/011; G06F 3/012; G06F 3/013; G06F 3/0346; G06F 3/1438; G06F 9/5038; G06F 2209/5017; G06T 19/006; G06T 15/00; G06T 15/005; G06T 17/00; G06T 19/00; G06T 7/596
See application file for complete search history.

(56) References Cited

U.S. PATENT DOCUMENTS

2019/0370926 A1   12/2019 Hagland
2020/0160534 A1*   5/2020 Labbe ............ H04N 21/440281
(Continued)

FOREIGN PATENT DOCUMENTS

WO     2017003769 A1     1/2017

OTHER PUBLICATIONS

EP Application No. 22200050.7, Office Action mailed Apr. 22, 2025, 6 pages.

(Continued)

*Primary Examiner* — Hau H Nguyen
(74) *Attorney, Agent, or Firm* — Gilliam IP PLLC

(57)     ABSTRACT

An extended reality (XR) streaming method of streaming XR images to an XR device is described. The XR streaming method comprising, generating, virtual content to be rendered with an XR application instance;

partitioning the virtual content to be rendered into a plurality of rendering jobs with the XR application instance;

forwarding the plurality of rendering jobs to at least a first and second rendering instance of a plurality of rendering instances;

generating first XR images based on the corresponding rendering job received by the first render instance from the XR application instance;

generating second XR images based on the corresponding rendering job received by the second render instance from the XR application instance; and blending the first XR images with the second XR images, with a merging instance to obtain blended XR images to be displayed on the XR device.

20 Claims, 2 Drawing Sheets

(56) References Cited

U.S. PATENT DOCUMENTS

| | | | |
|---|---|---|---|
| 2022/0012896 A1* | 1/2022 | Bond | ....................... G06T 7/194 |
| 2022/0070235 A1 | 3/2022 | Yerli | |
| 2022/0264110 A1 | 8/2022 | Mohammad et al. | |

OTHER PUBLICATIONS

"5G; Extended Reality (XR) in 5G (3GPP TR 26.928 version 17.0.0 Release 17)", ETSI Technical Report, European Telecommunications Standards Institute (ETSI), Sophia-Antipolis, France, vol. 3GPP SA, No. V17.0.0, May 5, 2022, pp. 1-133.
Bonatto, et al., "Real-Time Depth Video-Based Rendering for 6-DoF HMD Navigation and Light Field Displays", IEEE, IEEE Access, vol. 9, Oct. 27, 2021, 20 pages.
EP Application No. 22200050.7, Extended European Search Report mailed Feb. 24, 2023, 7 pages.

* cited by examiner

Figures 1, 2:
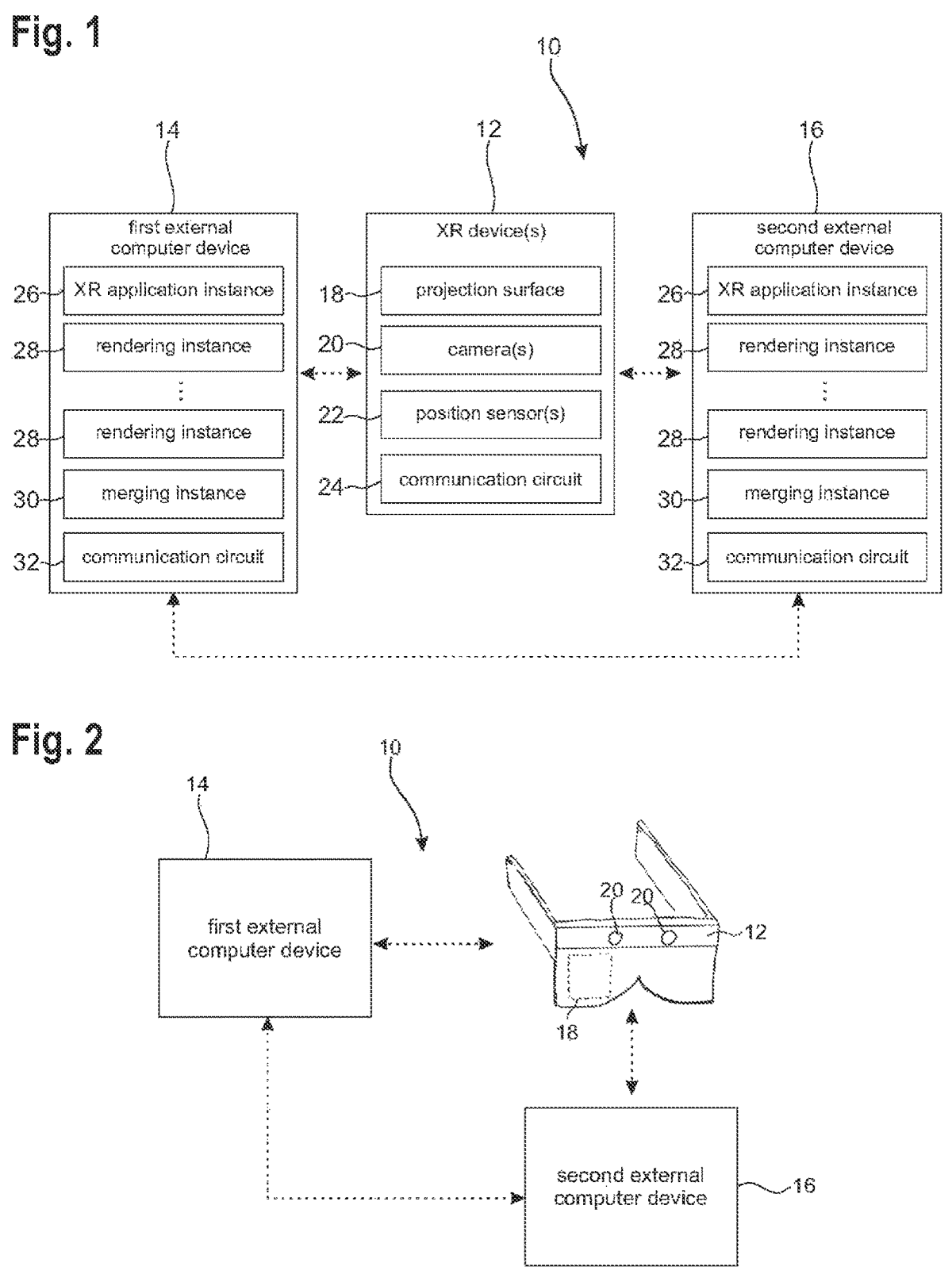

| 14 first external computer device | 12 XR device(s) | 16 second external computer device |
|---|---|---|
| 26 XR application instance | 18 projection surface | 26 XR application instance |
| 28 rendering instance | 20 camera(s) | 28 rendering instance |
| ⋮ | 22 position sensor(s) | ⋮ |
| 28 rendering instance | 24 communication circuit | 28 rendering instance |
| 30 merging instance | | 30 merging instance |
| 32 communication circuit | | 32 communication circuit |

14 first external computer device 20 20 12

18

16 second external computer device rendering job and
momentary position data

28

1st rendering
instance first XR images

26

XR application
instance

28

2nd rendering
instance

30 merging instance second XR images

28 n-th XR images momentary
position data n-th rendering
instance

12

10

PARTITIONING, RENDERING, AND BLENDING OF EXTENDED REALITY APPLICATION INSTANCES

FIELD OF THE DISCLOSURE

Embodiments of the present disclosure generally relate to an extended reality (XR) streaming method of streaming XR images to an XR device. Embodiments of the present disclosure further relate to an XR streaming system.

BACKGROUND

In certain XR applications, XR images to be displayed on an XR device of a user are streamed from an XR application instance that is implemented in an external computer device to the at least one XR device.

The at least one XR device receives and displays the XR image stream, i.e., the XR images associated with the XR image stream are displayed on a display of the at least one XR device.

With use cases of XR devices becoming ever more complex, e.g., in the field of mechanical and electrical engineering, there is a need to expand the capabilities of XR streaming systems to address the increasing complexity.

For example, industrial use cases may require rendering highly complex virtual content such as three-dimensional assets, e.g., computer-aided design (CAD) models corresponding to highly complex point clouds.

Thus, there is a need for an XR streaming method and system that are capable of handling highly complex virtual content.

SUMMARY

The following summary of the present disclosure is intended to introduce different concepts in a simplified form that are described in further detail in the detailed description provided below. This summary is neither intended to denote essential features of the present disclosure nor shall this summary be used as an aid in determining the scope of the claimed subject matter.

Embodiments of the present disclosure provide an extended reality (XR) streaming method of streaming XR images to an XR device. The XR streaming method comprises the steps of:

generating, by means of an XR application instance, virtual content to be rendered;

partitioning, by means of the XR application instance, the virtual content to be rendered into a plurality of rendering jobs;

forwarding the plurality of rendering jobs to at least two rendering instances, wherein the at least two rendering instances comprise a first rendering instance and a second rendering instance;

generating, by means of the first rendering instance, first XR images based on the corresponding rendering job received from the XR application instance;

generating, by means of the second rendering instance, second XR images based on the corresponding rendering job received from the XR application instance; and blending, by means of a merging instance, the first XR images with the second XR images, thereby obtaining blended XR images to be displayed on the XR device.

As used herein, the term "XR device" is understood to denote an electronic device that is configured to display an extended reality (XR) image, i.e., an augmented reality (AR) image, a mixed reality (MR) image, and/or a virtual reality (VR) image.

For example, the XR device may be a head-mounted display, e.g., an electronic wearable having the shape of glasses. However, it is to be understood that the XR device may be established as any other XR-capable electronic device, e.g., as a smartphone or as a tablet.

Moreover, the term "XR image" is understood to denote at least one (partially) virtual image.

In the case of augmented reality or mixed reality, the XR image corresponds to at least one virtual image that is superimposed over reality.

For example, the XR device may be a head-mounted display with a semi-transparent display, wherein the virtual image is displayed on the semi-transparent display such that the user can directly see the environment through the semi-transparent display with the virtual image superimposed.

As another example, the XR device may be a head-mounted display that is optically opaque. In this case, the head-mounted display may comprise at least one internal camera, particularly several internal cameras being configured to capture images of the environment of the head-mounted display. The real images captured by means of the internal camera are superimposed with the virtual image(s), and the resulting superposition of the real image(s) and the augmented reality image(s) is displayed on a display of the head-mounted display.

As another example, the XR device may be a smartphone or a tablet, wherein an image captured by means of a camera of the at least one XR device is superimposed with the at least one virtual image, and the resulting image is displayed on a display of the XR device.

In the case of virtual reality, the XR image corresponds to a virtual image being displayed on a display of the XR device.

For example, the XR device may be a head-mounted display that is optically opaque. The XR images, namely the VR images, may be displayed on a display of the head-mounted display.

Further, the term "instance" is understood to denote suitable hardware, suitable software, or a combination of hardware and software that is configured to execute the described functionality.

Accordingly, the term "XR application instance" is understood to denote suitable hardware, suitable software, or a combination of hardware and software that is configured to execute a certain XR application.

For example, the XR application may be an engineering application that is configured to generate virtual content associated with a 3D model of an object, e.g. of a car, of an engine, of a building, or of any other object.

In a particular example, a car may be recognized in the at least one image captured by means of the at least one camera, and may be superimposed with a 3D model of the car.

However, it is to be understood that the XR application may be any other type of augmented reality, mixed reality, or virtual reality application, e.g., a game or a metaverse application such as a social hub that may have different accessible areas.

In the context of the present disclosure, the term "blending" is understood to denote that the corresponding XR images are merged according to predefined rules, wherein the first XR images and/or the second XR images may be manipulated in a predefined manner in order to obtain the blended XR images, such that potential conflicts between the first XR images and the second XR images are mitigated.

The blended XR images may be transmitted to the XR device, and may be displayed on a display of the XR device.

The XR streaming method according to the present disclosure is based on the idea to split the computational effort for rendering the virtual content up into a plurality of rendering jobs, such that the virtual content can be rendered by the at least two rendering instances in parallel.

In other words, the at least two rendering instances render different portions of the virtual content in parallel, such that complex virtual content can be rendered within a shorter period of time, which is particularly important if the virtual content has to be rendered in real time.

In fact, an arbitrary number of rendering instances may be provided, such that an arbitrary number or rendering jobs can be processed in parallel.

The rendering instances generate XR images corresponding to the different portions of the virtual content, wherein the rendering instances may generate the XR images independent of each other.

Afterwards, the XR images generated by the rendering instances are blended in a predefined manner, such that that the portions of the virtual content associated with both the first XR images and the second XR images can be displayed on the XR device simultaneously.

In other words, the blended images correspond to the complete virtual content to be displayed on the XR device, which is reconstructed by blending the first XR images with the second XR images according to predefined rules.

The first XR images and the second XR images are not simply superimposed, but are rather blended according to predefined rules, which ensures a pleasant user experience as the virtual content is correctly displayed on the XR device.

Further, conflicts between the first XR images and the second XR images are reliably avoided by means of the XR streaming method according to the present disclosure. In fact, this allows for the independent rendering of different portions of the virtual content by the at least two rendering instances.

Several blending techniques are described hereinafter. It is to be understood that each of these blending techniques may be used exclusively. Alternatively, the different blending techniques may be combined arbitrarily.

According to an aspect of the present disclosure, the first XR images received from the first rendering instance are blended with the second XR images received from the second rendering instance by means of a positional blending technique based on an orientation of the XR device and/or based on a location of the XR device. Thus, the first XR images and the second XR images may be blended differently for different locations and/or for different orientations of the at least one XR device.

In other words, it is ensured that the virtual content associated with the first XR images and with the second XR images is correctly displayed on the at least one XR device depending on the location and/or orientation of the at least one XR device.

For example, if the at least one XR device is a head-mounted display, the orientation of the at least one XR device is directly correlated with a viewing direction of a user wearing the head-mounted display. Thus, the virtual content associated with the first XR images and with the second XR images may be displayed differently on the at least one XR device depending on the viewing direction of the user, as the first XR images and the second XR images are blended differently based on the orientation of the at least one XR device.

Particularly, the first XR images are blended with the second XR images based on a position of the at least one XR device, i.e., based on the location of the at least one XR device and based on the orientation of the at least one XR device.

For example, a sensor may be provided that detects the location and/or orientation of the at least one XR device, particularly of a reference point on the at least one XR device. For example, the reference point may be chosen such that the viewing direction of a user of the at least one XR device coincides with the orientation of the reference point, particularly if the at least one XR device is a head-mounted display worn by the user.

In an embodiment of the present disclosure, priorities are assigned to the first XR images and to the second XR images, wherein the first XR images are blended with the second XR images based on the priorities assigned to the first XR images and to the second XR images. In general, for each pixel, the corresponding pixel of the XR image having the highest priority is taken, if the XR image having the highest priority has a valid value for that pixel. For the remaining pixels, the corresponding pixel of the XR image having the second highest priority is taken, if the XR image having the second highest priority has a valid value for that pixel.

Accordingly, the (partial) virtual content associated with the XR images having the highest priority may always be displayed. The virtual content associated with XR images having lower priorities may at least partially be concealed by the higher priority XR images.

For example, priorities may be assigned to the rendering jobs corresponding to the first XR images and to the second XR images by means of the XR application instance. The priorities of the first XR images and of the second XR images may be equal to the priorities of the corresponding rendering jobs.

According to another aspect of the present disclosure, pixels having a predefined cutout color are cut from the XR images by means of the merging instance. Thus, pixels having the predefined cutout color do not have a "valid" value in the sense described above. In other words, the pixels having the predefined cutout color are removed from the XR images, such that XR images having lower priority may become visible.

For example, the predefined cutout color may be black, i.e., a pixel color value of 000000.

However, it is to be understood that the predefined cutout color may be any other color.

In a further embodiment of the present disclosure, alpha data is streamed to the merging instance by means of the first rendering instance and the second rendering instance. The alpha data comprises transparency information associated with the pixels of the XR images, wherein the first XR images are blended with the second XR images based on the alpha data. Thus, the color and transparency of each pixel of the blended XR images may be determined based on the color values and the alpha values of the corresponding pixel of the first XR images and of the second XR images.

In other words, the individual pixels of the first XR images and of the second XR images are merged based on their respective color values and based on their respective alpha values in order to obtain the blended XR images.

Particularly, the first XR images may be blended with the second XR images based on the alpha data and based on priorities of the first XR images and of the second XR images.

For example, the color values and/or the alpha values of XR images having higher priority may be weighed with a higher weighting factor than color values and/or the alpha values of XR images having lower priority in order to obtain the blended XR images.

Depth data may be streamed to the merging instance by means of the first rendering instance and the second rendering instance. The depth data comprises depth information associated with the pixels of the XR images, wherein the first XR images are blended with the second XR images based on the depth data. Particularly, the depth data comprises information on the distance of each pixel of the corresponding XR image from the XR device.

For example, each pixel of the blended XR images may be determined by comparing the depth information on the corresponding pixels of the first XR images and of the second XR images, wherein the corresponding pixel being closest to the XR device may be taken over for the blended XR images.

According to an aspect of the present disclosure, different rendering jobs correspond to different portions of a virtual object, particularly to different portions of a 3D model. In other words, the virtual object (e.g., a three-dimensional model of an object) may be partitioned into a plurality of portions, and the individual parts may be rendered independently of each other. Afterwards, the XR images corresponding to the different portions of the virtual object are blended as described above, thereby obtaining the blended XR images corresponding to the complete virtual object. Accordingly, the time necessary for rendering complex virtual objects is reduced significantly.

Alternatively or additionally, different rendering jobs may correspond to different virtual objects, particularly to different 3D models. In other words, different virtual objects may be rendered independently of each other. Afterwards, the XR images corresponding to the different virtual objects are blended as described above, thereby obtaining the blended XR images corresponding to the complete set of virtual objects. Accordingly, the time necessary for rendering a plurality of virtual objects is reduced significantly.

In an embodiment of the present disclosure, a list of rendering jobs is generated by means of the XR application instance, wherein the rendering jobs are forwarded to the at least two rendering instances based on the list of rendering jobs. For example, the first rendering job on the list of rendering jobs may be forwarded to the first rendering instance. The second rendering job on the list of rendering jobs may be forwarded to the second rendering instance, etc. If the number of rendering jobs on the list of rendering jobs is larger than a number n of available rendering instances, the (n+1)th rendering job may be forwarded to the first rendering instance again.

Alternatively, the rendering jobs may be forwarded to an available rendering instance randomly.

As another example, the virtual content may be partitioned area-wise, such that all rendering jobs associated with a first area are forwarded to the first rendering instance, all rendering jobs associated with a second area are forwarded to the second rendering instance, etc. The first area, the second area etc. may have arbitrary shape.

In a further embodiment of the present disclosure, the first rendering instance implements a first rendering engine, wherein the second rendering instance implements a second rendering engine, and wherein the first rendering engine is different from the second rendering engine. Accordingly, each rendering job may be forwarded to the rendering instance having the rendering engine being best suited for the respective rendering job.

Alternatively, all rendering instances may implement the same rendering engine.

A further aspect of the present disclosure provides that momentary position data is determined, wherein the momentary position data is associated with a momentary position of the XR device, wherein the momentary position data is forwarded to the at least two rendering instances, and wherein the first rendering instance and the second rendering instance generate the XR images based on the momentary position data. Thus, it is ensured that the XR images are correctly rendered by means of the rendering instances, such that the virtual content to be displayed matches the location and/or orientation of the XR device.

Particularly, the at least one XR device comprises at least one position sensor, wherein the momentary position data is determined by means of the at least one position sensor. For example, the at least one position sensor may be established as a gyroscope, as an acceleration sensor, as a magnetometer, as a global navigation satellite system (GNSS) device, or as any other suitable type of position sensor.

Particularly, the momentary position data is forwarded to the first rendering instance and to the second rendering instance in a synchronized manner. Thus, it is ensured that the rendering instances render the XR images based on the same position data, such that the first XR images and the second XR images relate to the same position of the at least one XR device. Accordingly, all virtual content associated with the first XR images and the second XR images is correctly displayed with respect to the position of the at least one XR device.

In a further embodiment of the present disclosure, the at least two rendering instances comprise dedicated rendering hardware. In other words, the at least two rendering instances may be established separately from each other, wherein each rendering instance comprises rendering hardware such as graphics processing units (GPUs). Thus, the different rending jobs can be processed within a reduced amount of time.

Embodiments of the present disclosure further provide an extended reality (XR) streaming system. The XR streaming system comprises at least one XR application instance, at least two rendering instances, and at least one merging instance. The XR streaming system is configured to perform the XR streaming method according to any one of the variants described above.

Regarding the advantages and further properties of the XR streaming system, reference is made to the explanations given above with respect to the XR streaming method, which also hold for the XR streaming system and vice versa.

According to an aspect of the present disclosure, the at least two rendering instances are implemented on a single server, or wherein the XR streaming system comprises a plurality of servers, wherein the at least two rendering instances are implemented on the plurality of servers. Accordingly, the rendering jobs may be processed by a single server or by a plurality of servers.

The different servers may be interconnected with each other, e.g., via a wide area network (WAN) or via the Internet.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 1 schematically shows a block diagram of an XR streaming system according to the present disclosure;

FIG. 2 schematically shows an exemplary embodiment of the XR streaming system of FIG. 1.

DETAILED DESCRIPTION

Figure 3:
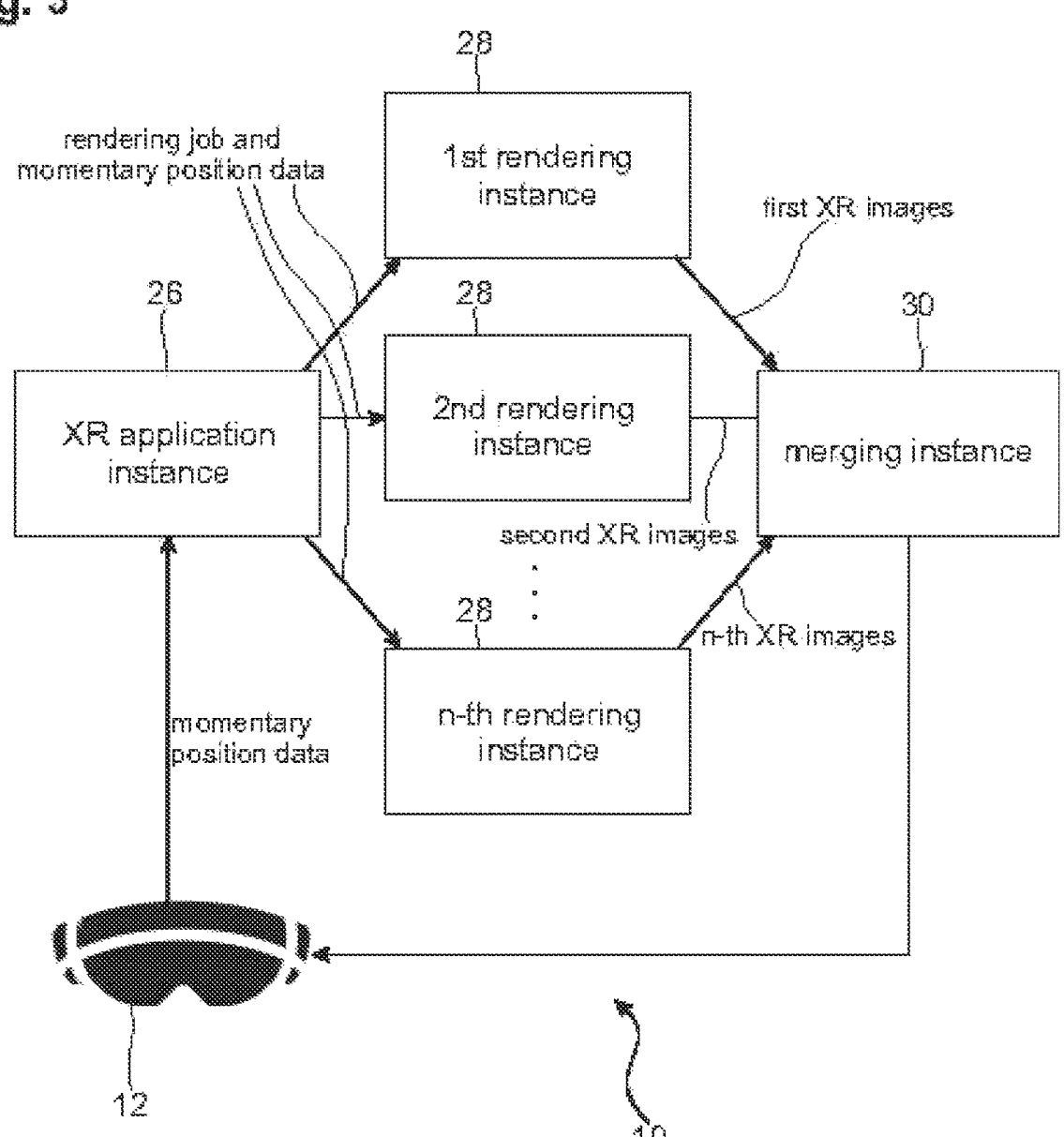
FIG. 3 shows a diagram illustrating an XR streaming method according to the present disclosure.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

For the purposes of the present disclosure, the phrase "at least one of A, B, and C", for example, means (A), (B), (C), (A and B), (A and C), (B and C), or (A, B, and C), including all further possible permutations when more than three elements are listed. In other words, the term "at least one of A and B" generally means "A and/or B", namely "A" alone, "B" alone or "A and B".

FIG. 1 schematically shows a block diagram of an XR streaming system 10 comprising at least one XR device 12 and a first external computer device 14.

It is noted that, without restriction of generality, only a single XR device 12 is described in the following. However, it is to be understood that the explanations given hereinafter likewise apply to the XR streaming system 10 comprising a plurality of XR devices being associated with a plurality of users.

As is indicated by the dashed arrow, the first external computer device 14 is connected with the XR device 12 in a signal-transmitting manner.

The XR streaming system 10 further comprises a second external computer device 16. The second external computer device 16 is connectable with the XR device 12 in a signal-transmitting manner.

As used herein, the terms "connectable", "connected", and "connected in a signal transmitting manner" are understood to denote a cable-based or wireless connection that is configured to transmit signals between the respective devices or components.

In general, the XR device 12 is an electronic device that is configured to display an extended reality (XR) image, i.e., an augmented reality (AR) image, a mixed reality (MR) image, and/or a virtual reality (VR) image.

As is illustrated in FIG. 2, the XR device 12 may, for example, be configured as a head-mounted display, particularly as an electronic wearable having the shape of glasses.

However, it is to be understood that the XR device 12 may be established as any other XR-capable electronic device, e.g., as a smartphone or as a tablet.

In general, the XR streaming system 10 allows a user to observe and/or interact with virtual objects, particularly virtual 3D objects, that are streamed from at least one of the external computer devices 14, 16 to the XR device 12.

If the XR streaming system 10 is an AR streaming system or an MR streaming system, these virtual objects are embedded into a real environment of the user.

Accordingly, the XR device 12 comprises at least one projection surface 18, wherein an XR image to be displayed is projected onto the projection surface 18, such that the virtual object is displayed to the user.

The projection surface 18 may be a display of the XR device 12.

Optionally, the XR streaming system 10 may comprise at least one handheld input device (not shown in FIG. 1), wherein the user may control the XR streaming system 10 by means of the at least one handheld input device.

For example, the at least one handheld input device may be established as a pen-shaped device, as a gamepad, or as any other type of suitable input device.

The XR device 12 further may comprise at least one camera 20, at least one position sensor 22, and/or a communication circuit 24.

As used herein, the term "circuit" is understood to describe suitable hardware or a combination of hardware and software that is configured to have a certain functionality.

The hardware may, inter alia, comprise a central processing unit (CPU), a GPU, a field-programmable gate array (FPGA), an application-specific integrated circuit (ASIC), or other types of electronic circuitry.

The at least one camera 20 is configured to capture images of an environment of the XR device 12, particularly of an environment in front of the XR device 12.

Particularly, the at least one camera 20 may be established as a stereo camera. Alternatively or additionally, the XR device 12 may comprise several cameras with overlapping fields of view. Thus, depth-information on images taken by the at least one camera 20 can be determined based on images taken by the at least one camera 20.

The at least one camera 20 may be operable in the visible light spectrum and/or in the infrared spectrum. For example, the XR device 12 may comprise at least one camera 20 being operable in the visible light spectrum, and at least one camera 20 being operable in the infrared spectrum.

The at least one position sensor 22 is configured to determine a position, i.e., a location and/or orientation of the XR device 12.

For example, the at least one position sensor 22 may be established as a gyroscope, as an acceleration sensor, as a magnetometer, as a GNSS device, and/or as any other suitable type of position sensor.

The XR device 12 may stream the determined position to the external computer devices 14, 16, such that an XR application or a plurality of XR applications running on the external computer devices 14, 16 takes the determined position of the XR device 12 into account.

In general, the first external computer device 14 and the second external computer device 16 may each be established as any type of electronic computing device that is configured to have the functionality described below.

For example, the external computer devices 14, 16 may be established as a personal computer, as a laptop, as a notebook, as a Mac® computer, as a tablet, as a smartphone, or as any other type of smart device, respectively.

Preferably, the external computer devices 14, 16 are established as a server, respectively.

Without restriction of generality, it is assumed in the following that the external computer devices 14, 16 are established as a server, respectively.

The external computer devices 14, 16 may be interconnected with each other, e.g., via a wide area network (WAN) or via the internet.

The first external computer device 14 comprises at least one XR application instance 26, a plurality of rendering instances 28, at least one merging instance 30, and a communication circuit 32.

In the exemplary embodiment shown in FIG. 1, the second external computer device 16 is configured identically with the first external computer device 14.

However, it is to be understood that the second external computer device 16 may be configured differently from the first external computer device 14. For example, the second external computer device 16 may be established as a dedicated computing device comprising only rendering instances 28 and a communication circuit 32.

In general, the XR application instances 26 of the external computer devices 14, 16 may be associated with the same or with different XR applications.

The communication circuit 24 of the XR device 12 and the communication circuits 32 of the external computer devices 14, 16 are configured to communicate with each other.

Image data, sensor data, position data and/or control data may be exchanged between the XR device 12 and the external computer devices 14, 16 by means of the communication circuits 24, 32.

Any suitable wireless or cable-based transmission technique may be used by the communication circuits 24, 32, e.g., wireless local-area network (WLAN), 4G, 5G, Ethernet, etc.

The XR streaming system 10 is configured to perform an XR streaming method for streaming XR images between at least one of the external computer devices 14, 16 and the XR device(s) 12. The XR streaming method is described in the following with reference to FIG. 3.

Momentary position data is determined and forwarded to the at least one XR application instance 26 that is connected with the XR device 12, wherein the momentary position data is transmitted via the communication circuits 24, 32.

In general, the momentary position data is associated with a momentary position of the XR device 12. In fact, the momentary position data comprises information on the momentary location of the XR device 12 and information on the momentary orientation of the XR device 12, as this uniquely determines the field of view of a user of the XR device 12 or of the XR device 12 itself.

In the exemplary embodiment shown in FIG. 3, the momentary position data is determined by means of the XR device 12.

The momentary position data may be determined by means of the at least one position sensor 22 of the XR device 12 and/or based on pictures captured by means of the at least one camera 20 of the XR device 12.

For example, the momentary position data may be determined based on measurements conducted by means of the at least one position sensor 22 and/or based on pictures of a spatial anchor captured by means of the at least one camera 20.

Alternatively or additionally, the momentary position data may be determined by means of at least one external camera, i.e., at least one camera that is not integrated into the XR device 12.

The momentary position data may be determined based on images of the XR device 12 captured by means of the at least one external camera. A corresponding analysis circuit that is configured to determine the momentary position data may be integrated into the XR device 12 or into the external computer device(s) 14, 16.

Optionally, the XR device 12 may comprise one or several light-emitting elements, particularly one or several light-emitting diodes (LEDs). The analysis circuit may determine the momentary position data based on images of the one or several light-emitting elements captured by means of the at least one external camera, particularly via triangulation.

Virtual content to be rendered is generated by means of the at least one XR application instance 26.

In general, the virtual content to be rendered may comprise a single virtual object or a plurality of virtual objects. For example, the virtual content to be rendered may comprise one or several three-dimensional CAD models that are to be rendered.

The virtual content to be rendered is partitioned into a plurality of rendering jobs by means of the XR application instance 26. Different rendering jobs correspond to different portions of a respective virtual object and/or to different virtual objects.

The rendering jobs may be arranged in a list of rendering jobs.

The rendering jobs are forwarded to a plurality of rendering instances 28, particularly based on the list of rendering jobs, wherein the rendering instances 28 may be implemented in the first external computer device 14 and/or in the second external computer device 16.

In the exemplary embodiment shown in FIG. 3, the rendering jobs are distributed to n rendering instances 28, wherein n is a natural number greater than or equal to 2.

Further, the momentary position data is forwarded to the rendering instances 28, particularly in a synchronized manner.

XR images are generated by the rendering instances 28 based on the respective rendering jobs, particularly wherein the rendering instances 28 generate the XR images independently of each other.

In fact, a first rendering instance 28 of the plurality of rendering instances 28 generates first XR images, a second rendering instance 28 of the plurality of rendering instances 28 generates second XR images, etc.

The rendering instances 28 may implement the same or different rendering engines to generate the XR images.

The XR images generated by rendering instances 28 are forwarded to the merging instance 30.

Optionally, alpha data and/or depth data associated with the respective XR images may be forwarded to the merging instance 30 together with the respective XR images.

Alternatively or additionally, XR image data associated with the XR images generated by the rendering instances 28 may comprise information on a view matrix and/or a projection matrix.

In general, the XR images may comprise virtual, world-anchored objects, particularly virtual 3D objects. Accordingly, these objects may be defined in a fixed coordinate space having its origin in the environment of the XR device 12. This coordinate space may also be called "world space".

The view matrix comprises all information necessary in order to transform objects from the world space to the view space, wherein the view space is associated with the XR device 12, particularly with the at least one camera 20 of the XR device 12. In the view space, the at least one camera 20 may rest at the origin, particularly wherein the main view direction of the XR device 12 and/or the at least one camera 20 is along the z-axis.

In other words, the view matrix comprises all information necessary in order to transform the virtual objects, particularly the virtual 3D objects, such that these objects can be correctly displayed in view of the position of the XR device 12.

Thus, as the location and orientation of the XR device 12 changes, the view matrix changes as well. Accordingly, the view matrix may be time-variant.

Particularly, the view matrix may be determined based on a determined momentary position of the XR device 12 or of the at least one camera 20 of the XR device 12.

Likewise, the view matrix may be determined based on a determined updated position of the XR device 12 or of the at least one camera 20 of the XR device 12.

The projection matrix comprises all information necessary in order to project objects from the view space into the projection space, wherein the projection space is associated with the XR device 12, particularly with the at least one camera 20 of the XR device 12. In general, this projection of objects into the projection space allows correct display of virtual (3D) objects on the XR device 12.

The XR images generated by the rendering instances 28 are blended by means of the merging instance 30, thereby obtaining blended XR images to be displayed on the XR device 12.

Several blending techniques are described hereinafter. It is to be understood that each of these blending techniques may be used exclusively. Alternatively, the different blending techniques may be combined arbitrarily.

Further, it is to be understood that different blending techniques may be used consecutively. For example, the first XR images may be blended with the second XR images using one blending technique, the resulting XR images may be blended with third XR images using another blending technique, etc.

According to a first variant, the first XR images received are blended with the second XR images by means of a positional blending technique based on an orientation of the XR device 12 and/or based on a location of the XR device 12.

Thus, the first XR images and the second XR images may be blended differently for different locations and/or for different orientations of the XR device 12.

For example, if the XR device 12 is a head-mounted display, the orientation of the XR device 12 is directly correlated with a viewing direction of a user wearing the head-mounted display. Thus, the virtual content associated with the first XR images and with the second XR images may be displayed differently on the projection surface 18 depending on the viewing direction of the user, as the first XR images and the second XR images are blended differently based on the orientation of the XR device 12.

Particularly, the first XR images are blended with the second XR images based on a position of the XR device 12, i.e., based on the location of the XR device 12 and based on the orientation of the XR device 12.

According to a second variant, the rendering jobs have respective priorities, wherein the XR images received from rendering instances 28 are blended based on the priorities of the corresponding rendering jobs.

In other words, the XR images generated by different rendering instances 28 have respective priorities, wherein the XR images received from the rendering instances 28 are blended based on the priorities of the XR images.

Thus, for each pixel, the corresponding pixel of the XR image having the highest priority is taken, if the XR image having the highest priority has a valid value for that pixel.

For the remaining pixels, the corresponding pixel of the XR image having the second highest priority is taken, if the XR image having the second highest priority has a valid value for that pixel, etc.

Accordingly, the virtual content associated with the XR images corresponding to the rendering job having the highest priority may always be displayed. The virtual content associated with XR images having lower priorities may be at least partially concealed by the higher priority XR images.

Optionally, pixels having a predefined cutout color are cut from the XR images by means of the merging instance 30. Thus, pixels having the predefined cutout color do not have a "valid" value in the sense described above.

In other words, the pixels having the predefined cutout color are removed from the first XR images, from the second XR images, etc. in order to obtain the blended XR images, such that virtual content associated with XR images having lower priority may become visible.

For example, the predefined cutout color may be black, i.e., a pixel color value of 000000.

However, it is to be understood that the predefined cutout color may be any other color.

According to a third variant, alpha data is streamed from the rendering instances 28 to the merging instance 30.

The alpha data comprises transparency information associated with the pixels of the XR images, wherein the XR images generated by different rendering instances 28 are blended based on the alpha data.

Thus, the color and transparency of each pixel of the blended XR images may be determined based on the respective color values and the respective alpha values of the corresponding pixel of the XR images generated by the rendering instances 28.

In other words, the individual pixels of the first XR images and of the second XR images are merged based on their respective color values and based on their respective alpha values in order to obtain the blended XR images.

Particularly, the XR images generated by the rendering instances 28 may be blended based on the alpha data and based on the priorities of the respective rendering jobs.

For example, the color values and/or the alpha values of XR images having higher priority may be weighed with a higher weighting factor than color values and/or the alpha values of XR images having lower priority in order to obtain the blended XR images.

According to a fourth variant, depth data is streamed from the rendering instances 28 to the merging instance 30.

The depth data comprises depth information associated with the pixels of the XR images, wherein the XR images generated by the rendering instances 28 are blended based on the depth data. Particularly, the depth data comprises information on the distance of each pixel of the corresponding XR image from the XR device 12.

For example, each pixel of the blended XR images may be determined by comparing the depth information on the corresponding pixels of the XR images generated by the rendering instances 28, wherein the corresponding pixel being closest to the XR device 12 may be taken over for the blended XR images.

The blended XR images are streamed to the XR device 12 and are displayed on the XR device 12, particularly on the projection surface 18.

Thus, the virtual content associated with all XR images generated by the rendering instances 28 is displayed on the XR device 12 simultaneously.

The XR images generated by the rendering instances 28 are not simply superimposed, but rather blended according to predefined rules as described above, which ensures a pleasant user experience and correct display of the virtual content generated by the XR application instance 26.

Certain embodiments disclosed herein, particularly the respective module(s) and/or unit(s), utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about", "approximately", "near" etc., mean plus or minus 5% of the stated value.

The invention claimed is:

1. A method of streaming extended reality (XR) images from a first computer device of a plurality of computer devices that are external to an XR device comprising:

generating virtual content to be rendered with an XR application instance running on the first computer device;

partitioning the virtual content to be rendered into a plurality of rendering jobs with the XR application instance;

forwarding the plurality of rendering jobs to at least two rendering instances that are configured to render the respective rendering jobs, wherein the at least two rendering instances comprise a first rendering instance running on the first computer device and a second rendering instance running on a second computer device of the plurality of computer devices;

generating first XR images with the first rendering instance based on a first rendering job received from the XR application instance;

generating second XR images with the second rendering instance based on a second rendering job received from the XR application instance, wherein the first XR images and the second XR images are rendered by the first rendering instance and the second rendering instance in parallel;

streaming the second XR images, first depth data corresponding to the first XR images, and second depth data corresponding to the second XR images to a merging instance running on the first computer device, wherein the first depth data comprise depth information associated with pixels of the first XR images and the second depth data comprise depth information associated with pixels of the second XR images; and blending the first XR images with the second XR images with the merging instance based on the first depth data and second depth data to obtain blended XR images to be displayed on the XR device.

2. The method of claim 1, wherein blending the first XR images with the second XR images comprises positionally blending the first XR images with the second XR images based on at least one of an orientation of the XR device and a location of the XR device.

3. The method of claim 1, further comprising assigning priorities to the first XR images and to the second XR images, and wherein the first XR images are blended with the second XR images based on the priorities assigned to the first XR images and to the second XR images.

4. The method of claim 3, further comprising cutting pixels having a predefined cutout color from the first XR images and the second XR images with the merging instance.

5. The method of claim 1, further comprising streaming alpha data to the merging instance with the first rendering instance and the second rendering instance, wherein the alpha data comprise transparency information associated with pixels of the first XR images and the second XR images, and wherein blending the first XR images with the second XR images further comprises blending the first XR images with the second XR images based on the alpha data.

6. The method of claim 1, wherein different rendering jobs correspond to different portions of a virtual object.

7. The method of claim 1, wherein different rendering jobs correspond to different virtual objects.

8. The method of claim 1 further comprising: generating a list of rendering jobs with the XR application instance; and forwarding the first rendering job to the first rendering instance and the second rendering job to the second rendering instance based on the list of rendering jobs.

9. The method of claim 1, wherein the first rendering instance implements a first rendering engine, wherein the second rendering instance implements a second rendering engine, and wherein the first rendering engine is different from the second rendering engine.

10. The method of claim 1 further comprising:

determining momentary position data, wherein the momentary position data is associated with a momentary position of the XR device; and forwarding the momentary position data to the at least two rendering instances, wherein generating the first XR images and the second XR images with the first rendering instance and the second rendering instance, respectively, comprises generating the first XR images and the second XR images based on the momentary position data.

11. The method of claim 10, further comprising forwarding the momentary position data to the first rendering instance and to the second rendering instance in a synchronized manner.

12. The method of claim 1, wherein the at least two rendering instances comprise dedicated rendering hardware.

13. The method of claim 1, wherein blending the first XR images with the second XR images with the merging instance based on the first depth data and second depth data comprises, for each pixel of the blended XR images, determining the closest of a corresponding first pixel of the first XR images and a corresponding second pixel of the second XR images based on a first distance of the XR device to a portion of a virtual object rendered for the first pixel and a second distance of the XR device to a portion of the same or another virtual object rendered for the second pixel.

14. A system comprising:

a first computer device of a plurality of computer devices communicatively coupled to and external to an extended reality (XR) device, wherein the first computer device is configured to, generate virtual content to be rendered with an XR application instance;

partition the virtual content with the XR application instance into a plurality of rendering jobs;

forward the plurality of rendering jobs to at least two rendering instances that are configured to render the respective rendering jobs, wherein the first computer device is configured to run a first rendering instance of the at least two rendering instances;

generate first XR images with the first rendering instance based on a first rendering job received from the XR application instance; and stream first depth data corresponding to the first XR images to a merging instance that runs on the first computer device, wherein the first depth data comprise depth information associated with pixels of the first XR images; and a second computer device of the plurality of computer devices, wherein the second computer device is configured to, generate second XR images with a second rendering instance of the at least two rendering instances based on a second rendering job received from the XR application instance, wherein the second XR images are rendered in parallel with the first XR images; and stream the second XR images and second depth data corresponding to the second XR images to the merging instance, wherein the second depth data comprise depth information associated with pixels of the second XR images; and wherein the first computer device is further configured to blend the first XR images with the second XR images with the merging instance based on the first and second depth data to obtain blended XR images to be displayed on the XR device.

15. The system of claim 14, wherein the first and second computer devices comprise servers.

16. The system of claim 14, wherein blending the first XR images with the second XR images with the merging instance further comprises determining the closest of a corresponding first pixel of the first XR images and a corresponding second pixel of the second XR images based on a first distance of the XR device to a portion of a virtual object rendered for the first pixel and a second distance of the XR device to a portion of the same or another virtual object rendered for the second pixel.

17. The system of claim 14, wherein the first computer device is further configured with a first rendering engine that is utilized by the first rendering instance to render the first XR images and the second computer device is configured with a second rendering engine that is utilized by the second rendering instance to render the second XR images, wherein the first rendering engine and the second rendering engine comprise different rendering engines.

18. A non-transitory machine-readable medium having program code stored thereon, the program code comprising instructions to:

generate virtual content to be rendered with an extended reality (XR) application instance that runs on a first computer device of a plurality of computer devices communicatively coupled to and external to an XR device;

partition the virtual content to be rendered into a plurality of rendering jobs with the XR application instance;

forward the plurality of rendering jobs to at least two rendering instances that are configured to render the respective rendering jobs, wherein the at least two rendering instances comprise a first rendering instance that runs on the first computer device and a second rendering instance that runs on a second computer device of the plurality of computer devices;

generate first XR images with the first rendering instance based on a first rendering job received from the XR application instance;

generate second XR images with the second rendering instance based on a second rendering job received from the XR application instance, wherein the first XR images and the second XR images are rendered by the first rendering instance and the second rendering instance in parallel;

stream the second XR images, first depth data corresponding to the first XR images, and second depth data corresponding to the second XR images to a merging instance running on the first computer device, wherein the first depth data comprises depth information associated with pixels of the first XR images and the second depth data comprise depth information associated with pixels of the second XR images; and blend the first XR images with the second XR images with the merging instance based on the first depth data and second depth data to obtain blended XR images to be displayed on an XR device.

19. The non-transitory machine-readable medium of claim 18, wherein the instructions to blend the first XR images with the second XR images comprise program code to positionally blend the first XR images with the second XR images based on at least one of an orientation of the XR device and a location of the XR device.

20. The non-transitory machine-readable medium of claim 18, wherein the instructions to blend the first XR images with the second XR images with the merging instance based on the first depth data and second depth data comprise instructions to determine the closest of a corresponding first pixel of the first XR images and a corresponding second pixel of the second XR images based on a first distance of the XR device to a portion of a virtual object rendered for the first pixel and a second distance of the XR device to a portion of the same or another virtual object rendered for the second pixel.

* * * * *